United States Patent
Lain et al.

(10) Patent No.: US 7,031,021 B1
(45) Date of Patent: Apr. 18, 2006

(54) RANDOMIZED SUPERPIXELS TO ENHANCE MULTILEVEL IMAGE QUALITY IN ECONOMICAL, FAST INCREMENTAL-PRINTING ERROR DIFFUSION

(75) Inventors: Antonio Lain, Bristol (GB); Alberto Such, Barcelona (ES); Francisco Guerrero, Barcelona (ES)

(73) Assignee: Hewlett-Packard Development Company, L.P., Houston, TX (US)

( * ) Notice: Subject to any disclaimer, the term of this patent is extended or adjusted under 35 U.S.C. 154(b) by 790 days.

(21) Appl. No.: 09/642,416

(22) Filed: Aug. 19, 2000

(51) Int. Cl.
  *H04N 1/40* (2006.01)

(52) U.S. Cl. ...................... 358/1.9; 358/3.01; 358/3.03; 358/534; 382/162; 382/252

(58) Field of Classification Search ................. 358/1.9, 358/3.01, 3.03, 3.04, 3.06, 515, 534, 3.19; 382/162, 166, 232, 251, 252, 299
See application file for complete search history.

(56) References Cited

U.S. PATENT DOCUMENTS 6,203,133 B1 * 3/2001 Tanaka et al. ................. 347/15
6,315,391 B1 * 11/2001 Kanematsu .................. 347/43
6,331,898 B1 * 12/2001 Yokoi et al. .................. 358/1.9

* cited by examiner

*Primary Examiner*—Thomas D. Lee
(74) *Attorney, Agent, or Firm*—Peter I. Lippman

(57) ABSTRACT

While powerful in diffusion at one resolution to print photos at a finer resolution, the invention is not thus limited. It defines superpixels ("spels") for each desired colorimetric level, generates/receives image data, renders by finding levels for image positions, and prints an image using selected spels. One invention aspect finds a randomized value at each found level and uses the value to select the spel from plural ones for each level. Another aspect derives/maintains a randomized-value matrix; and maps a matrix location to an image position, to select a random value at that location and spel for that position. Another uses the value in common for all planes to select a spel for each plane at the found level—compatible spels for different planes, to coordinate color placement in planes. Another controls defining/selecting for a blue-noise property of spels in aggregate. In another, spels defined for a level vary in value to yield nonintegral color quanta. Preferences: Rendering is 1D per color, plus a dummy dimension holding the value (a least-significant bit from rendering, in a color dimension but decorrelated from levels)—and derives/maintains the matrix, derived/corrected for blue noise and including small interleaved 1D matrices tiled across and wrapped around the larger. Mapping uses values as pointers into dimensions of a spel table, and color-plane identification as a pointer into a third table dimension; it uses a common value in all planes to avoid drop-on-drop. Spels are Fourier-screened.

32 Claims, 6 Drawing Sheets

Fig. 4
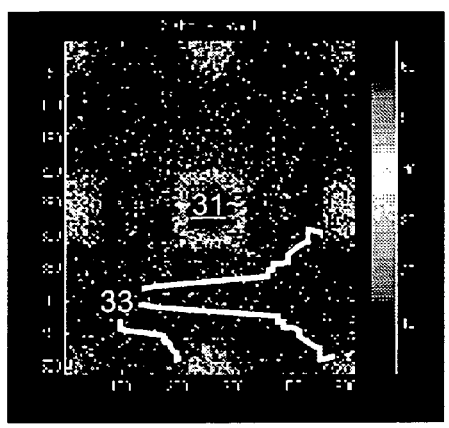
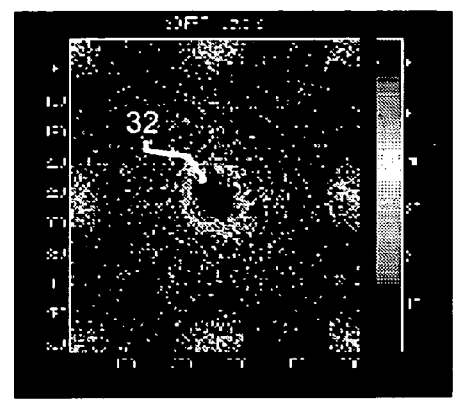
Fig. 5
Fig. 6
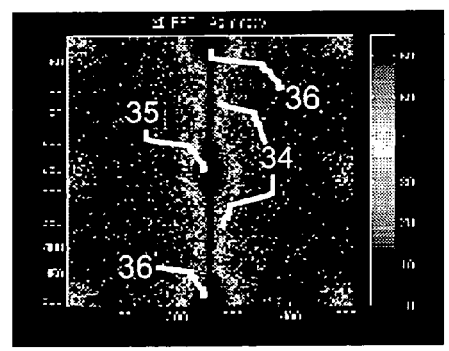
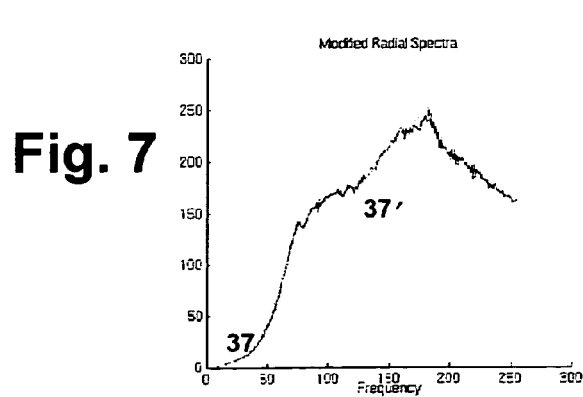
Fig. 7
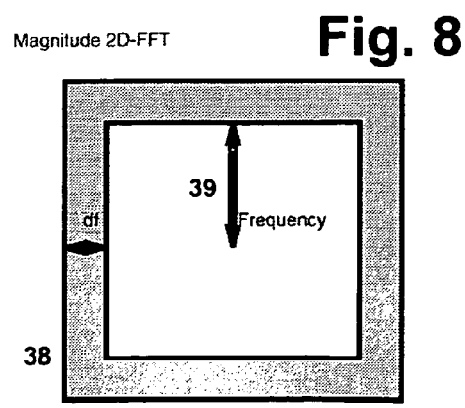
Fig. 8

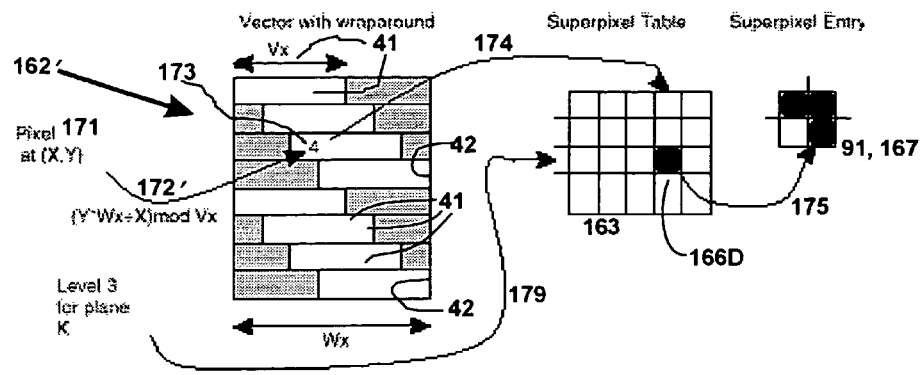
Fig. 9
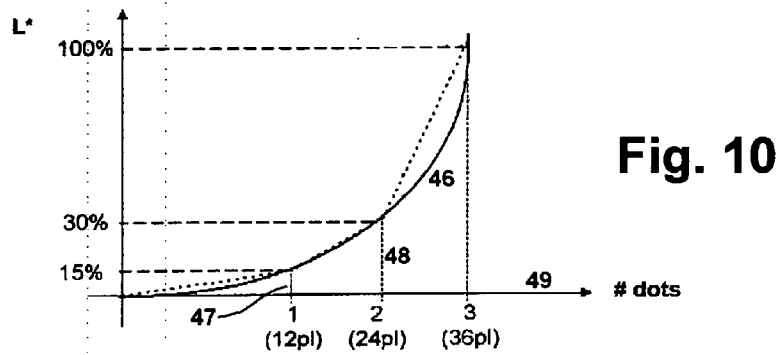
Fig. 10
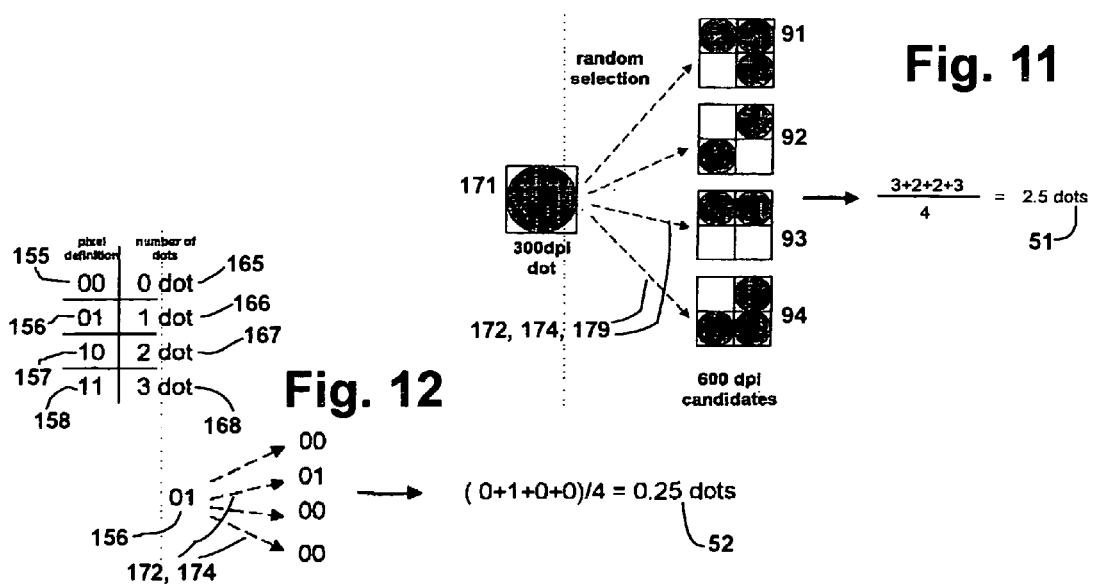
Fig. 11
Fig. 12

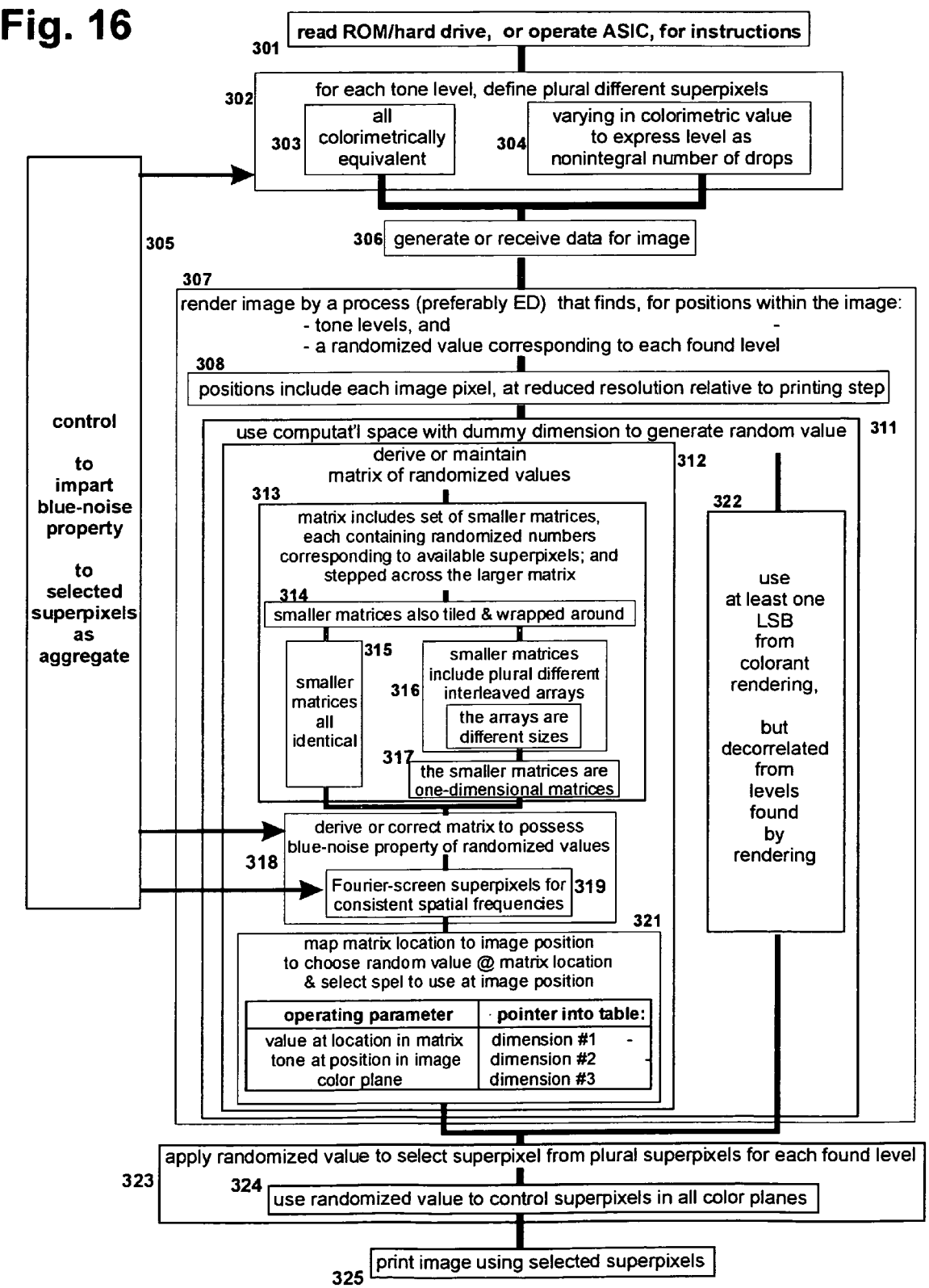

RANDOMIZED SUPERPIXELS TO ENHANCE MULTILEVEL IMAGE QUALITY IN ECONOMICAL, FAST INCREMENTAL-PRINTING ERROR DIFFUSION

RELATED PATENT DOCUMENTS

Closely related documents are other, coowned U.S. utility-patent applications filed in the United States Patent and Trademark Office substantially contemporaneously with this document—and also hereby incorporated by reference in their entirety into this document. One is in the names of Gil et al., and identified as Hewlett Packard Company docket number PD-60001011Z30, and entitled "DISCRETIONARY DOTTING FOR ARTIFACT CONTROL IN INCREMENTAL PRINTING"—and subsequently assigned utility-patent application Ser. No. 09/632,197, and issued as U.S. Pat. No. 6,443,556. Other such documents are in the names of Garcia-Reyero et al., and identified as Hewlett Packard Company docket number PD-60990037Z23, and entitled "IMPROVEMENTS IN AUTOMATED AND SEMIAUTOMATED PRINTMASK GENERATION FOR INCREMENTAL PRINTING", and op cit. therein—and subsequently assigned utility-patent application Ser. No. 09/642,417. Another related document, filed somewhat later, is in the names of Gil et al., and identified as Hewlett Packard Company docket PD-60003198Z33, and entitled "EXTERNALLY CUSTOMIZED TONAL-HIERARCHY CONFIGURATION, AND COMPLEMENTARY BUSINESS ARRANGEMENTS FOR INKJET PRINTING"—and subsequently assigned utility-patent application Ser. No. 09/775,771.

Also related, coowned and wholly incorporated by reference herein but filed earlier are U.S. utility-patent applications Ser. No. 08/960,766 of Bockman et al., relating to use of lookup tables in error diffusion, and Ser. No. 09/384,735 of Askeland, proposing "very-high-ratio mixed resolution", and Ser. No. 09/184,577 also of Askeland, teaching random selection of calorimetrically equivalent superpixels.

FIELD OF THE INVENTION

This invention relates generally to machines and procedures for incremental printing of text or graphics on printing media such as paper, transparency stock, or other glossy media, or textiles; and more particularly to a scanning thermal-inkjet machine (whether printer, copier or facsimile receiver) and method that construct text or images—but primarily high-quality photograph-like images—incrementally from individual ink spots created on a print medium, in a two-dimensional pixel array. The invention is especially valuable for very large images, and when processing speed is constrained by use of economical off-the-shelf processors without hardware assist, i.e. without the aid of an application-specific integrated circuit ("ASIC"), but it is not limited to use in connection with such constraints.

BACKGROUND OF THE INVENTION (a) Orientation—The present-day marketplace for computer printing devices is extraordinarily competitive. Successful products for photo-type images no longer need only produce fine-looking prints, or operate at high throughput, or be inexpensive—but now must do all three.

Thus there is great commercial pressure to use multiple calorimetric levels to achieve smooth gradations for reproducing continuous-tone images, and to perform high-quality photo-like rendering—by relatively computation-intensive error diffusion rather than dither masking. (As will be seen, for smooth gradations it can be particularly important to employ multilevel processing in the rendition stage even if the final printing stage is only binary.) The market also demands high resolution, at least to the degree that the eye is able to discern this quality.

There is also great market pressure for very high processing speed, and this requirement is compounded when the apparatus is to print very large images—which of course entail processing extremely high quantities of data. At the same time, however, there is intense economic pressure to use only commercial off-the-shelf electronic processors, avoiding the cost of an ASIC to carry the error-diffusion burden.

Accordingly these market conditions present a formidable challenge to the limitations of the technology. For example, in the case of inkjet products associated with the present invention, for each printing-element array (printhead, or pen) it is desired to control printing of up to two dots in each pixel of a 24-by-24 dot/mm (600 dpi) grid, or up to one dot in each pixel of a 48-by-24 dot/mm (1200-by-600 dpi), in images of poster size.

(b) Previous efforts—Earlier generations of large-format products, e.g. of the Hewlett-Packard Company, approached these seemingly conflicting goals by using matrix-based binary printing, and performed the rendering and halftoning at a resolution lower than the final printing resolution—followed by some algorithm to artificially increase the resolution when printing the image.

Combining dithering and single-level halftoning imposed distinct limits to the image quality, and these are not acceptable in the present advanced generation of these devices. In addition, for lower-quality printmodes rendering was performed at lower resolution and then a method of pixel replication was used to print the lower-resolution images at a higher printing resolution—a very fast technique.

Image-quality defects, however, included patterning in area fills due to dithering, and objectionable artifacts arising from the replication. (Close inspection would reveal that 24 dot/mm pixels were identical across pixel groupings.) Naturally the method is inflexible in that the total number of drops printed in a certain area is the number of pixels set to one ("1") in the rendered image, times the scaling factor.

Also known are various other devices and systems involving use of smaller pixel structures. The first above-mentioned Askeland document, for example, substitutes several extremely asymmetrical small pixels for each square standard-size pixel to produce very fine actual (not simulated) horizontal resolution). Other artisans have proposed insertion of a very localized finer-resolution data grid (e.g. for antialiasing). As far as the present inventors are aware, no such prior technique was for the purpose—or had the effect—of expanding a rendering resolution into a simulated final printing resolution throughout an image.

(c) Conclusion—Former configurations produced strikingly attractive printouts at modest cost and thus were successful within the level of development of the market then prevalent, but cannot satisfy the more-stringent current market demands outlined above. Thus important aspects of the technology used in the field of the invention remain amenable to useful refinement.

SUMMARY OF THE DISCLOSURE

The present invention introduces such refinement. In its preferred embodiments, the present invention has several aspects or facets that can be used independently, although they are preferably employed together to optimize their benefits.

In preferred embodiments of its first major independent facet or aspect, the invention is a method for printing an image. The method includes the step of—for at least each calorimetric level that will be found in rendering the image—defining plural different superpixels.

As will be understood, the levels that will be found in rendering are part of a set that is ordinarily well known in advance of beginning the online steps. They are design elements of the overall operating method.

The invention also includes the step of generating or receiving data for the image. Another step is rendering the image by a process that finds, for positions within the image:
  calorimetric levels, and
  a randomized value corresponding to substantially each found calorimetric level.

The method also includes the step of applying the randomized value to select a superpixel from the plural superpixels for each found colorimetric level. Yet another step is printing the image using the selected superpixels.

The foregoing may represent a description or definition of the first aspect or facet of the invention in its broadest or most general form. Even as couched in these broad terms, however, it can be seen that this facet of the invention importantly advances the art.

In particular, not only does it enable high-quality photograph-type printing by very fast error diffusion and with excellent color depth, using an off-the-shelf processor without hardware assist; but in addition this facet of the invention also provides a kind of simulated 24 dot/mm (600 dpi) rendition—out of a 12 dot/mm (300 dpi) rendition process. That is to say, a close inspection of the finished printing will show that in general adjacent 24 dot/mm pixels are different from one another, even though the error diffusion is performed at 12 dots/mm. Thus this aspect of the invention does not suffer from the kinds of image artifacts associated with e.g. pixel replication.

Although the first major aspect of the invention thus significantly advances the art, nevertheless to optimize enjoyment of its benefits preferably the invention is practiced in conjunction with certain additional features or characteristics. In particular, there are two alternative preferences as to the definition of superpixels:
  in one preference, the superpixels defined for each available calorimetric level are all calorimetrically equivalent; and
  in the other preference, the superpixels defined for at least one colorimetric level vary in calorimetric value—in such a way as to express that colorimetric level, on average, as a nonintegral number of colorant quanta.

Another basic preference is that the rendering step operate in a computational space that has one dimension for each colorant available, plus at least one dummy dimension which generates the randomized value. If this preference is observed, then there are two alternative subpreferences:
  in one case, operation of the rendering step in the at least one dummy dimension includes using at least one least-significant bit that:
    results from the rendering step in a colorant dimension, but
    is substantially decorrelated from colorimetric levels found by the rendering step; and
  in the other case, operation of the rendering step in the at least one dummy dimension includes deriving or maintaining a matrix of randomized values; and the applying step includes mapping a particular location in the matrix to a particular position in the image —to choose a random value at the particular location in the matrix for selection of a superpixel to use at the particular position in the image.

The second of these cases is also the second main aspect of the invention, stated below. Thus preferences as to matrix maintaining will be deferred for discussion with that second aspect.

In preferred embodiments of its second major independent facet too, the invention is a method for printing an image. Like the first, this method includes defining plural different superpixels for each available colorimetric level, and generating or receiving data for the image—and also printing the image using selected superpixels.

This method, however, also includes steps that are different. One of these is rendering the image by a process that finds calorimetric levels for positions within the image. Another is deriving or maintaining a matrix of randomized values.

Yet another step is mapping a particular location in the matrix to a particular position in the image. The result of this step is choice of a randomized value, at the particular location in the matrix, for selection of a superpixel to use at the particular position in the image.

The foregoing may represent a description or definition of the second aspect or facet of the invention in its broadest or most general form. Even as couched in these broad terms, however, it can be seen that this facet of the invention importantly advances the art.

In particular, this approach to obtaining randomized values for selection of superpixels is nearly free in terms of processing time, and quite economical in terms of information-storage requirements. The randomized matrix can be large if desired; however, it need not be very large.

The reason is that the results of the random selection implied by this matrix are further scrambled by the later printmasking stage. Therefore any tiling of this matrix can be made to contribute little to eventual patterning in the image as printed.

Although the second major aspect of the invention thus significantly advances the art, nevertheless to optimize enjoyment of its benefits preferably the invention is practiced in conjunction with certain additional features or characteristics. In particular, preferably the matrix is derived or corrected to possess a blue-noise property of the randomized values.

Other basic preferences are that the mapping step include interpreting:
  the value, found at each location in the matrix, as a pointer into a certain dimension of a table of superpixels;
  an input or output calorimetric level, for the particular position in the image, as a pointer into a certain dimension of the table of superpixels; or
  a both—but with regard to different (i.e. first and second) "certain" dimensions, respectively.

Another preference is that the mapping step include interpreting identification of a color plane being rendered, as a pointer into a third dimension of the table of superpixels.

Yet another basic preference is that the mapping step include using the found randomized value for control of superpixels in all color planes. Still another is that the matrix include a set of smaller matrices, each of which contains randomized numbers corresponding to available superpixels; and that successive ones of the smaller matrices be progressively stepped across the larger, first-mentioned matrix.

In this latter case, a number of subpreferences (not necessarily all mutually compatible) arise, namely that:

the stepped smaller matrices also be tiled across the larger matrix and wrapped around at an edge of the larger matrix;

the smaller matrices all be substantially identical;

the smaller matrices include plural different interleaved arrays (in which case it is also preferred that the plural different arrays be different sizes); and the smaller matrices be one-dimensional matrices.

Another basic preference as to the second facet of the invention is that the superpixels defined for at least one calorimetric level vary in colorimetric value so as to express that calorimetric level, on average, as a nonintegral number of colorant quanta. (As will be seen from earlier discussion, however, an alternative preference is that the superpixels have substantially the same colorimetric value.)

In preferred embodiments of its third major independent facet or aspect, the invention is a method for printing an image. Like the first two aspects, this method includes defining plural different superpixels for each available colorimetric level, and generating or receiving data for the image—and also printing the image using selected superpixels.

Additionally included is the step of rendering the image by a process that finds colorimetric levels for positions within the image.

The method further includes the step of selecting a superpixel from the plural superpixels for the found colorimetric level. Yet further included in the method is the step of controlling the defining or selecting step, or both, to impart a blue-noise property to the selected superpixels—considered as an aggregate.

The method also includes the step of printing the image using the selected superpixels. The foregoing may represent a description or definition of the third aspect or facet of the invention in its broadest or most general form. Even as couched in these broad terms, however, it can be seen that this facet of the invention importantly advances the art.

In particular, this facet of the invention is particularly noteworthy in that it provides an extraordinarily sophisticated solution to a subtle but important problem. This problem takes the visible form of distinctly different kinds of graininess, or clumping tendency, at different levels of colorant saturation.

In particular, randomness or so-called "noise" that is generated in ED when operating the invention near the error threshold values, is commonly white noise—i.e., roughly flat in spectral distribution. (The reason is that the "error" being diffused is substantially zero, so that the color "signal" consists of values from a controlling random number generator—and such values ordinarily are by definition random, i.e. white.) Noise from the error-diffusion process generally, however, is representatively blue noise.

Thus this third facet of the invention strongly facilitates equalization of the graininess property for different colorimetric levels, within each color plane. The result is to thereby make images appear more uniform in esthetic quality.

Although the third major aspect of the invention thus significantly advances the art, nevertheless to optimize enjoyment of its benefits preferably the invention is practiced in conjunction with certain additional features or characteristics. In particular, preferably the defining step includes screening the superpixels for spatial-frequency characteristics.

Thereby spatial frequencies, other than information in the image, appear substantially consistent in the printed image. The above phrase "other than information in the image" is discussed at the end of the detailed-description section of this document. (From the preceding discussion of the third main facet of the invention, it can be appreciated that a blue-noise characteristic in the process of selecting superpixels is desirable; however, it does not fully guarantee that the content of the superpixels themselves will follow a blue-noise characteristic.) When this preference is observed, it is particularly beneficial that the screening include spatial Fourier analysis.

Another preference, noted for the main aspects of the invention discussed above, is that the superpixels defined for at least one colorimetric level vary in calorimetric value so as to express that colorimetric level, on average, as a nonintegral number of colorant quanta. In this way the superpixel approach to developing 24 dot/mm appearance is in essence exploited to provide finer gradations in calorimetric level as invoked by input level variations throughout the image.

In preferred embodiments of its fourth major independent facet or aspect, the present invention is apparatus for printing an image. This apparatus includes some means for defining plural different superpixels for each available calorimetric level. For purposes of breadth and generality in discussing the invention, these means will be called simply the "defining means".

The apparatus also comprises some means for generating or receiving data for the image. Again for generality and breadth, these will be called the "data means".

In addition the apparatus includes some means for rendering the image by a process that finds calorimetric levels for positions within the image. These, again for like reasons, will be called the "rendering means".

Further included are some means for generating or receiving a randomized value for each of the positions within the image. These may be called the "random-value means".

The apparatus also includes "applying means" for applying the randomized value, in common for all color planes, to select for each color plane a respective superpixel from the plural superpixels for the found colorimetric level. Additionally included are "printing means" for printing the image using the selected superpixels.

The foregoing may represent a description or definition of the fourth aspect or facet of the invention in its broadest or most general form. Even as couched in these broad terms, however, it can be seen that this facet of the invention importantly advances the art.

In particular, application of a common randomized value for superpixel control in all control planes provides certain of the important benefits of plane-dependent error diffusion. The cost of actual plane-dependent operation, however, in terms of storage or processing capability/time, is far higher than the common-value technique of the present invention.

Although the fourth major aspect of the invention thus significantly advances the art, nevertheless to optimize enjoyment of its benefits preferably the invention is practiced in conjunction with certain additional features or characteristics. In particular, preferably the applying means include means for employing a randomized value which corresponds to a compatible set of superpixels for different color planes.

If this preference is followed, then further preferably the compatible set of superpixels includes coordinated placement of colorant quantity in the different color planes to achieve a certain image-quality objective. Still further if this subpreference is observed then preferably the coordinated placement includes elimination of substantially all drop-on-drop placement across planes, within highlight regions of the image.

Another basic preference, mentioned earlier with respect to the first three main facets of the invention, is that the superpixels defined for at least one calorimetric level vary in calorimetric value so as to express that calorimetric level, on average, as a nonintegral number of colorant quanta. The benefits of each main aspect can thus be enjoyed in combination with the enhanced smoothness of gradation achieved by generating superpixels whose average is a fractional calorimetric level; and this broad preference may be regarded as a fifth principal aspect of the invention.

All of the foregoing operational principles and advantages of the present invention will be more fully appreciated upon consideration of the following detailed description, with reference to the appended drawings, of which:

BRIEF DESCRIPTION OF THE DRAWINGS

FIG. 4 is a reproduction of an automatically generated two-dimensional (2D) FFT Fourier-analysis plot for level 1 of a two-by-two superpixel;

FIG. 5 is a like 2D FFT reproduction for level 2 of the FIG. 4 superpixel;

FIG. 6 is a like reproduction illustrating detection of asymmetry with the 2D FFT;

FIG. 7 is a graph of output from a modified radial spectrum (MRS) derived from the 2D FFT of FIGS. 4 and 5;

FIG. 8 is a diagram of the square-annular integration geometry used in obtaining the FIG. 7 MRS;

FIG. 9 is a mapping diagram analogous to FIG. 2 but using a one-dimensional (1D) array or "vector" with wraparound, instead of the 2D matrix of FIG. 2;

FIG. 10 is a graph of optical density vs. number of dots, for discussion of nonintegral-state linearization;

FIG. 11 is a diagram of superpixel random selection for expanding a single dot in a 12 dot/mm grid into a nonintegral number, on-average, of dots in a 24 dot/mm grid;

FIG. 12 is a tabulation with accompanying diagram and arithmetic for generating a fractional number, on-average, of dot;

FIG. 16 is a flow chart showing operation of the FIGS. 13 and 14 device (but also including some off-line steps of preparation), particularly as used to practice the first, second and fourth aspects of the invention.

DETAILED DESCRIPTION OF THE PREFERRED EMBODIMENTS

Figure 1:
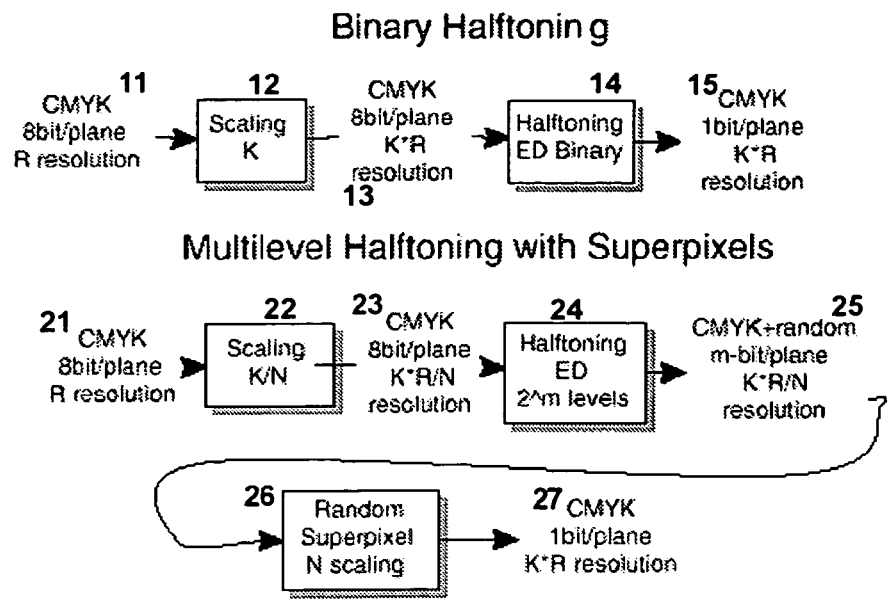
FIG. 1 is a very general flow diagram comparing conventional binary halftoning with the multilevel, superpixel halftoning of the present invention.

1. Mapping Spatial Resolution to Colorimetric Resolution

Actual spatial resolution needed for photograph-like reproduction is low (6 to 8 dot/mm, 150 to 200 dpi), provided that the number of possible color levels is high enough. The low resolution requirement applies particularly in large-format images as these are most commonly viewed at relatively greater distances—and also if the above-mentioned strict identicality of adjacent pixels is avoided. Therefore actual imaging of details can be traded-off for more colors to enhance smooth calorimetric gradation.

This approach is pursued in the present invention. Preferred embodiments of the invention combine the benefits of multilevel error diffusion and fine colorimetric resolution, to virtually eliminate both patterning and color contouring.

The invention, however, is applicable to systems in which the final printing stage is actually either multi-level or binary. In other words, the multilevel ED processing may be only an intermediate step—and binary operation may precede, or follow, or both. Needless to say, multilevel final output produces the finest quality.

The inventors' first effort to divert system capability from spatial resolution into colors was deterministic, mapping different intensity levels of the primary colors to a particular cell—denominated a "superpixel"—in the image. Unfortunately, interaction between regular patterns generated by the halftoning and various repeating physical errors in the printer (misdirected nozzles, printing-medium advance errors etc.) produced conspicuous artifacts.

2. Randomized Mapping—Benefits and Drawbacks

Those artifacts were significantly reduced through use of large randomized printmasks, according to the techniques described in the previously mentioned documents of Garcia-Reyero. The artifacts, however, still did not disappear completely.

By using plural different superpixels for each intensity level, and choosing among them at each pixel, the inventors obtained further reduction in regularity. At the same time, the differences among the superpixels also artificially provided a variation in level from pixel to pixel—thereby maintaining a seeming fine texture to the image even if very closely inspected.

An additional improvement was to make the superpixel choice randomly. (Random choice of superpixels to reduce banding is introduced in the previously mentioned Askeland document.) Thereby the system was made much more resistant to printer errors, and the fine texture made still more irregular and realistic.

Therefore the invention achieves, in an extremely economical system, an excellent rich environment for reproduction of continuous-tone images. While presenting a simulated fine spatial resolution it is essentially free of patterning and contouring.

Randomizing the selection of superpixels, however, had two negative consequences. One was the computational overhead of generating a random number for each pixel. That overhead is large enough to eradicate the performance benefit over binary halftoning.

The second was much more subtle. When halftoning a patch, or a region in an image, with a constant color similar to one of the threshold levels defined in the error-diffusion process, the output was noisy.

In that case, no error is propagated and what appears is very noticeable white noise directly from the superpixel selection. This in itself is perhaps acceptable, since noise occurs for colors intermediate between the threshold levels, too; however, the noise characteristics are distinctly different.

While random clumping of dots at or near ED thresholds has a white-noise character, the texture for intermediate colors has more high-frequency content—i.e. so-called "blue noise". Unexpectedly, this difference is readily seen and introduces an irrational-seeming fluctuation in overall appearance as colors change.

Various approaches to resolving these randomization problems are taken up in turn below. They include using a simple random-number generator, sharing the same randomness for all color planes, and trying to add blue-noise character to the random-number generation process.

These efforts also made clear how important it is to choose a correct set of superpixels to represent a given level. This becomes increasingly more difficult with increasing superpixel size—which in itself is desirable to reduce the effective resolution used in rendering—because the number of candidates for a given level grows very fast with superpixel size.

A starting point is four-weight binary error diffusion that somewhat randomizes the distribution of error by perturbing the ED weights. Serpentine raster processing was adopted to further reduce directionality artifacts. Extension of that algorithm to multilevel representations is straightforward; lookup tables are used in the error processing to avoid the computational burden of doing comparisons and distributing the errors arithmetically.

3. Algorithm Overview

Here are some terms that will be used in the explanation that follows:

original resolution—resolution of the image before any scaling;

rendering resolution—resolution of the image just before halftoning (this might include some scaling during the rasterization);

device resolution—resolution of the image just before printing (this might be different from rendering resolution if some scaling is performed after half-toning); and superpixel—a mapping from the rendering to the device resolution, which expands into a two-dimensional cell each of the output levels of the halftoning.

Conventional binary halftoning 11–15 (FIG. 1) is distinctly different from a multilevel halftoning 21–27 that uses superpixels. In the binary case, CMYK contone data 11 (eight bits per plane), assumed to be already color corrected, are scaled 12 to the device resolution. 13. Then they are halftoned 14 using error diffusion to obtain one bit 15 per plane at the device resolution.

The present multilevel approach, by contrast, performs the scaling in two steps. The first uses a conventional method, bilinear scaling 22, to bring the image 21 to the resolution 23 used for the halftoning (rendering resolution).

Next comes an ED variant 2, which generates five planes 25: CMYK, and "random", with m bits each—where m is small, i.e. 2, 3 or 4. (As to both conventional binary technique 11–15 and the innovative multilevel method 21–27, greater numbers of colorants are permitted. For instance six colorants CMYKcm including dilute cyan and magenta, are part of a particularly preferred embodiment.)

The random plane, together with a predefined set of superpixels, will later be used to scale up to the final device resolution by mapping each of the levels (defined by m bits) to a superpixel 26. The superpixel itself can be assumed binary, although this is by no means a requirement of the invention. That is, in both the earlier binary halftoning and the present multilevel halftoning, the final output can be four binary planes 27 with the same resolution (K·R).

For a presently preferred product embodiment, and also for the sake of simplicity in explanation, it can be assumed that the final device is binary. This means that for the rest of the system it is irrelevant that one intermediate step uses multilevel processing—except that, as noted earlier, this is a particularly economical, rapid and effective way to process the data.

If the final device supports multilevel printing, however, such printing is readily supported by providing multilevel (nonbinary) superpixels. Thus the invention is extremely versatile with regard to the final output form.

Multilevel ED with random superpixels has at least three major advantages:

(a) Reduce processing overhead—Scaling and half-toning with error diffusion constitute most of the computations, in a color pipeline according to preferred embodiments of the invention. By using a lower resolution in both operations, it is possible to significantly speed up the processing.

In particular it was found that use of a 12 dot/mm four-level ED with superpixel output provided a 2½-fold throughput improvement over traditional 24 dot/mm binary ED (both using binary scaling to map a 60 Mbyte photo to an E-size sheet). Final image quality was very comparable for the two methods.

(b) Reduce bandwidth and memory requirements—Expansion of the superpixels can be delayed until the last moment before printing, even on the fly with some hardware support. Even with no extra-hardware support the overhead of this expansion is small, given a fast processor.

The benefit of such delay is that the size of a swath before superpixel expansion is much smaller than after expansion: 12 dot/mm with four levels (two data bits per pixel) is half the size of 24 dot/mm binary. The delay therefore reduces the memory needed, the disc bandwidth requirement for directing printing from it, or network bandwidth for printing RTL (raster transfer language) plots, if they are in this format.

(c) Minimize halftoning artifacts—The combination of serpentine raster processing, built-in weight randomization and random superpixels significantly reduces most of the worm-like artifacts that standard ED techniques produce in highlight areas. Also, random selection of a set of compatible superpixels across color planes for each pixel is preferable to independent selection of superpixels independently for each color plane.

Selection of compatible sets reduces problems of interactions of different planes. In particular, this strategy can be exploited to reduce graininess by avoiding placement of drops in one plane on top of drops in another plane in light tone regions.

On the other hand, accompanying these three advantages there is a disadvantage. Because rasterization takes place at lower resolution, notwithstanding the presence of a simulated high resolution, text and line art may not appear as "crisp" as they would if full resolution were used.

4. Randomization Techniques

Successful practice of preferred embodiments of the invention calls for generation of pseudorandom numbers quickly. It is also desirable that the numbers have certain properties—such as limited low frequencies, which are more visible to the eye; and absence of any particular directionality, which could produce artifacts.

The overhead of random number generation is significantly reduced by using the same number for all the color planes (CMYK). This is equivalent to adding a fifth plane (R, for "random") that determines the superpixel selection for the other four, at each level.

As suggested earlier, this tactic has an interesting and very beneficial side-effect: it enables definition of a family of superpixels, one for each plane—that are likely to be printed together. The superpixels in each set can be designed to minimize interactions between color planes, so that some plane-dependent benefits are obtained even though the halftoning is nominally plane independent.

(a) Standard random number generator (RNG)—The inventors experimented with several techniques for random number generation. One was to use an off-the-shelf library call, "1rand48", which provides a uniformly distributed sequence of pseudorandom numbers.

This module uses a linear congruential algorithm with forty-eight-bit integer arithmetic. It gives excellent quality, with no visible artifacts due to correlation across lines—with an important exception, mentioned earlier:

When halftoning patches with colors near a halftoning threshold, the error itself is zero. What is seen, then, is a pattern determined exclusively by the spectral properties of the random-number sequence.

In the present case that sequence is essentially white noise, which includes a relatively large low-frequency content, not very pleasant to the eye. This appearance is different from the basic texture of error diffusion, which is a blue-noise characteristic.

The white-noise characteristic is particularly annoying in smooth gradients crossing a halftoning threshold. The reason is that in traversal of the threshold level, the noise texture of the printed image changes from blue to white and then back again to blue.

The transition is thereby made very visible. It would be possible to apply a high-pass filter to the random-number sequence, but after preliminary effort this solution appeared too expensive.

Another problem was that the off-the-shelf RNG was too slow, losing all the benefits of lower-resolution rendering. A related alternative was to reduce this overhead by precomputing a random sequence and reusing it across lines, but then correlated artifacts began to appear. The off-the-shelf RNG was then abandoned, and work started on a custom RNG.

(b) Error-diffusion RNG—Preferred embodiments of the invention need only a few random bits (typically two) to guide the superpixel selection. It is well known that the least significant bit (LSB) of typical images carries very limited image content, and this is even more clear after applying complex scaling (i.e. bilinear).

This fact implies that the LSB of each error value propagated during the ED halftoning of images is nearly uncorrelated with the original image and thus provides a reasonable degree of randomness. In other words, the proposition is to use part of the ED error itself as the random bits.

The favorable properties of the LSB can be enhanced by performing an exclusive-or (XOR) function on the error LSBs across the four color planes, and initializing the error buffer with small random values instead of zeroes. In practice the cost of doing the XOR and masking the LSB was negligible—no extra memory-access call was needed, and the quality of the output for images was very nearly as good as with the off-the-shelf RNG.

Unfortunately, when applied to solid patches the results were not as good as for images. In particular, when the solid-patch color was exactly the same as one of the halftoning threshold levels—so that no error was to be propagated—some correlated artifacts could appear.

This problem could be easily fixed by monitoring when the error was consistently zero, and in that case fall back to the off-the-shelf RNG. The extra comparisons would carry some penalty, and some peculiar cases would operate slowly; but overall this technique would be faster than the first method.

Another problem with the ED RNG was the same as discussed above for the standard RNG, relating to white-noise character of the output when operating near an ED threshold. The cost of dealing with the noise characteristic here too was deemed excessive.

(c) Matrix-based RNG—One way to impart a blue-noise property to a sequence of random numbers is to pre-compute a matrix of values with that property. One way to begin is with a blue-noise dithering matrix (introduced by the previously mentioned document of Lin).

Figure 2:
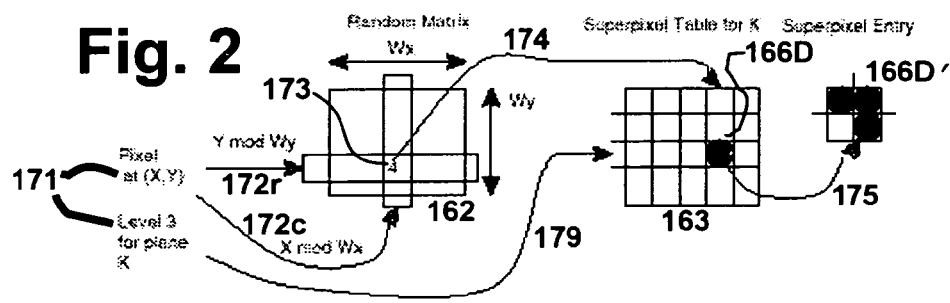
FIG. 2 is a diagram showing three mappings used to locate a superpixel table entry—and thereby a particular superpixel—in matrix-based random selection of superpixels according to certain preferred embodiments of the invention, particularly employing a two-dimensional (2D) matrix.

Levels in that matrix can be collapsed until what remains are all entries ranging from unity through the number of superpixels, and roughly the same number of entries per level. That collapsed matrix 162 (FIG. 2) can be used to generate pseudorandom superpixels 166D'.

Given a pixel 171 with coordinates x and y we index (172r for rows and 172c for columns) inside that matrix with the coordinates relative to the matrix, obtaining a random entry 173. The superpixel 166D' that will be inserted in position for a particular color plane 91–94 (FIG. 3) is obtained by entering a superpixel selection table 163 with:

that random entry 173 as an abscissa pointer 174, the intensity level 171 as an ordinate pointer 179, and if desired, the plane being rendered as plane pointer (not shown).

The last-mentioned choice is actually not necessary in preferred embodiments, since the same random entry advantageously is used for all planes to gain the plane-dependent properties noted earlier.

This process is somewhat similar to now-conventional dithering with a blue-noise matrix—with the important difference that no threshold operation is required at this point. In addition, the size of the superpixel tables 163 is kept small because the range of intensity levels 171, 179 has already been heavily reduced by error diffusion.

Therefore this operation can be performed very quickly and without significant memory overhead. Furthermore this methodology avoids the previously mentioned difficulties of mismatched noise characteristics.

Using this method in ED of a solid patch that is exactly the color of an ED threshold, however, does produce a repeated pattern. In practice such a repetitive pattern can be hidden by using a large enough random matrix 162—and a matrix of two hundred fifty-six values has been found a reasonable size for this purpose.

(d) Randomization by 1D arrays—An alternative is a scheme using a one-dimensional array or so-called "vector" 41 (FIG. 9), or several such arrays of different lengths, with wrap-around. In a single-array case, the array 41 has length $V_x$ and is filled with random numbers from one through the maximum number of equivalent superpixels.

Typically random numbers chosen for the array have a high-frequency spectral characteristic, in order to reduce graininess. The index into this array is obtained by tiling (FIG. 9) the page 162' with the array, but wrapping the array sequence around 42 at the end of the line (page width is $W_x$). In the illustration what is tiled is the array sequence rather than any individual array, since an integral number of arrays is spaced to fit into the page width as shown.

In practice, the index into the array is computed from the input pixel coordinates (x,y) by counting the number of pixels from the top left corner of the page to this pixel (while traversing the page left-to-right and top-to-bottom), and calculating the relative offset of this value inside the array (i.e., $(y \cdot W_x + x) \bmod V_x$). The random number 173, 174 in the array 162' corresponding to that index, together with the input level 179, is used to select the superpixel cell 91, 167A from a lookup table 163. Typically $V_x$ and $W_x$ are chosen relatively prime of each other so that the pattern does not repeat across many lines.

This scheme can be generalized by using multiple 1D arrays (i.e., N arrays), possibly of different sizes, and using array i for rows of the input image i, i+N, i+2N, . . . wrapping this array around within this subset of rows. (Other, less-systematic stepping is also feasible and may be preferable.) This interleaving makes the pattern even less repeatable across lines.

5. Superpixel Selection

Although the random matrix has a blue-noise property, it does not follow that this property must be preserved after expansion of the superpixels selected using that matrix. It is the expanded superpixels that the end-user sees. This issue will be taken up shortly, and related comments appear at the end of this detailed description.

It would be possible to provide different superpixels for each intensity level (i.e. four, if two data bits are in use), and for each random choice (again four is typically enough). This implies designing $4^3 = 64$ matrices of two-by-two elements (i.e. to double the resolution).

A way to simplify the problem is rotation of the roles of the planes for each random choice: this reduces by a factor of four the number of superpixels to be selected. Also whenever possible it is desirable to use the stacking property that ensures monotonic behavior: a superpixel of a higher level includes a superpixel of lower level for the same plane and random choice.

Design of a compatible-superpixel set is advantageously guided by these goals:

(a) Keep blue-noise quality after expansion—The matrix-based RNG described above is best used to ensure blue-noise characteristics. Using Fourier-analysis techniques described below, it is provided that these properties are preserved in using a set of superpixels.

(b) Reduce asymmetric artifacts—It is possible for individual superpixels to emphasize particular directions, for example the horizontal. Such tendencies individually are acceptable.

If, however, a common directional emphasis is present in many superpixels—for example, if all superpixels in a set emphasize the horizontal—then resulting printouts too will have excessive horizontal directionality. This problem is complicated if the system uses nonsquare superpixels, in which simple rotations are not sufficient to eliminate directionality.

A consequence of all such asymmetry problems is unwanted artifacts that defeat the randomization. Such tendencies can be tracked using Fourier analysis, as will be seen.

(c) Sample the intensity levels uniformly—Most typically, printed intensity level is not linear with the number of inkdrops per superpixel producing the level. Compensation is possible through use of nonproportional numbers of drops.

Figure 3:
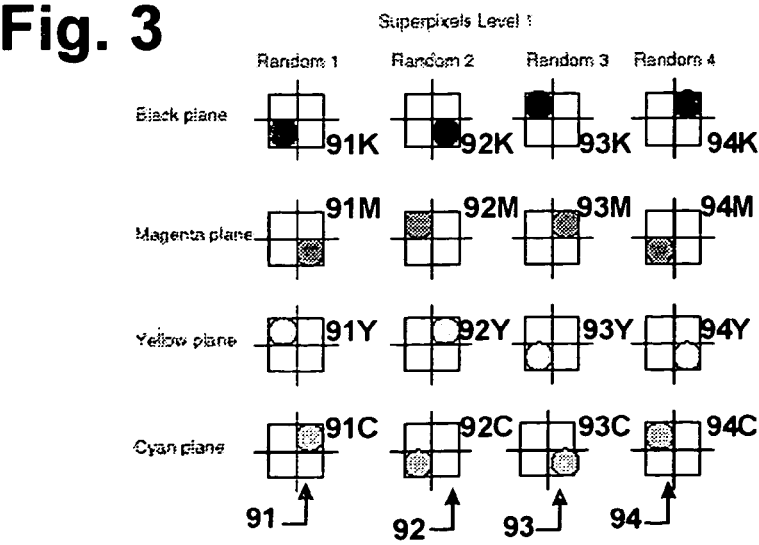
FIG. 3 is a diagram of compatible superpixels for use in the several color planes of an image, for minimizing conflicts across planes in highlight regions of the image.

(d) Minimize conflicts across planes—FIG. 3 shows an example of superpixels 91C–94K that eliminate all drop-on-drop deposition across planes in image highlights (i.e. level 1 and less). The random number selects a column 91–94 of superpixels, for control of all the planes in a coordinated way.

Advantageously this technique is implemented in such a way that no two superpixels put a drop into the same image position. This precaution reduces graininess in the highlights.

(e) Minimize the firing frequency of the pens—A dense horizontal line, if it must be implemented all within a single pass, can require a higher pen firing frequency that a dense vertical or diagonal line. Therefore trying to avoid dense horizontal patterns in superpixels is helpful.

6. Fourier Analysis of Superpixels

Superpixel selection is advantageously based upon the goals and principles introduced above. The process of selecting superpixels, however, is not yet fully automated.

Currently as a starting point the technique uses a lower-rank superpixel that performs reasonably well, and adds extra drops one by one in each random set. For each one added, a Fourier analysis is performed to ensure that the design goals are reasonably met.

If not, then another candidate is chosen—based somewhat on intuition—and the analysis rerun. Although the process seems labor intensive, in most cases the superpixels are not bigger than four-by-four (i.e. mapping 12 to 24 dot/mm) and the number of possible candidates does not explode.

To perform the Fourier analysis the original random matrix is expanded into n matrices, where n is the number of intensity levels. Each one is the result of inserting the superpixels for that particular level using that random entry; this is repeated for each plane if different behavior across planes is expected.

(Expansion for each level makes practical sense as that can happen in an area fill. Such regions do occur, even though a primary objective is printing of photo-like images.)

For example, if the random matrix has 256 by 256 entries and the system is to use two-by-two binary superpixels with four input levels, then four binary matrices of 512 by 512 will be generated. Then a 2D-FFT (magnitude) of each of these four matrices is computed.

As an example of this, a display of such an FFT level 1 (one drop per superpixel) shows a reasonable blue-noise spectrum. It has little low-frequency content 31 (FIG. 4) and reasonable high-frequency content (the rest of the image, including some peripheral energy clusters 33).

A like display for level 2 (two drops per superpixel) also has limited low-frequency response 32. Also, both show reasonable symmetry—as opposed to an example that derives from use of superpixels in level 2 (two drops per superpixel) that only have vertical and diagonal entries, no horizontal ones. In the latter case the result is an extended vertical structure 34 (FIG. 6), with large lobes 36 at top and bottom, linked to the central, low-frequency concentration 35.

A better way to see the blue-noise property, however, is by examining a modified radial spectrum (MRS) derived from the 2D-FFT previously computed. This is similar to radially averaged power spectra described in Digital Half-toning by Robert Ulichney—but instead of using the power spectrum this method integrates the magnitude of the 2D-FFT between concentric squares 38 (FIG. 8), rather than circles.

This method reflects better the limitation of the human eye to see diagonal lines. Computing the MRS of the superpixels shown in FIGS. 4 and 5, it appears in FIG. 7 that low-frequency content 37 is small, and growth 37' is steep for higher frequencies for both levels. It has been checked empirically that superpixels with higher MRS in the low frequencies are less visually pleasing.

These modifications to standard halftoning algorithms permit reduction of system requirements (memory, processing power, and storage) without decreasing the effective quality of printed images. This is enabled by multilevel techniques that allow rendition at lower resolution, together with randomization techniques that reduce artifacts of doing so. An area of compromise is in text and line-art input, where high spatial resolution is required.

7. Linearization with Nonintegral States

In thermal inkjet devices the image is obtained by firing an integral number of drops into a pixel grid. Multidrop devices can fire N drops in every cell of the grid, with N an integer and $N \geq 1$ (i.e. 1, 2, 3, . . . ). The halftoning process determines the number of dots that correspond to each cell of the grid.

Once the pen architecture is closed, the drop size of the pen is fixed—establishing a discrete relationship between the amount of ink per pixel and the number of drops. This relationship in combination with the media ink-absorption characteristic ("drop gain") determines a finite set of pairs in the L* curve (FIG. 10) or, more precisely, optical-density curve.

There are situations, however, in which it may be desirable to deposit an amount of ink per pixel that doesn't match well to any integral number of dots. Such a requirement may arise from considerations of ink limiting, or of gradation smoothness, or other factors.

Thus for instance it may be desired to hold the maximum amount of liquid 49 per pixel to 2¾ dots (about 33 picoliters) rather than settling for any integral breakpoint 47, 48, . . . in the number of dots. In ink-limiting terms, the effect on cockle for a given print medium may be importantly affected, and the resultant inking may be extremely useful notwithstanding the accompanying effect on optical density.

A particularly useful application of this technique is to obtain intermediate values 51 (FIG. 11), 52 (FIG. 12) in the linearization of output density 171, 155–158 to device states 165–168. Although the superpixeling is used primarily to print at higher resolution than the halftoning resolution, it can also provide intermediate values along the dot axis—i.e. on average a nonintegral number of dots.

8. Mechanical and Program/Method Features

The invention is amenable to implementation in a great variety of products. It can be embodied in a printer/plotter that includes a main case 1 (FIG. 13) with a window 2, and a left-hand pod 3 which encloses one end of the chassis. Within that enclosure are carriage-support and -drive mechanics and one end of the printing-medium advance mechanism, as well as a pen-refill station with supplemental ink cartridges.

The printer/plotter also includes a printing-medium roll cover 4, and a receiving bin 5 for lengths or sheets of printing medium on which images have been formed, and which have been ejected from the machine. A bottom brace and storage shelf 6 spans the legs which support the two ends of the case 1.

Just above the print-medium cover 4 is an entry slot 7 for receipt of continuous lengths of printing medium 4. Also included are a lever 8 for control of the gripping of the print medium by the machine.

A front-panel display 211 and controls 212 are mounted in the skin of the right-hand pod 213. That pod encloses the right end of the carriage mechanics and of the medium advance mechanism, and also a printhead cleaning station. Near the bottom of the right-hand pod for readiest access is a standby switch 214.

Within the case 1 and pods 3, 213 a cylindrical platen 241 (FIG. 15)—driven by a motor 242, worm and worm gear (not shown) under control of signals from a digital electronic processor 71—rotates to drive sheets or lengths of printing medium 4A in a medium-advance direction. Print medium 4A is thereby drawn out of the print-medium roll cover 4.

Meanwhile a pen-holding carriage assembly 220 (FIGS. 14 and 15) carries several pens 223–226 (FIG. 14) back and forth across the printing medium, along a scanning track—perpendicular to the medium-advance direction—while the pens eject ink. For simplicity's sake, only four pens are illustrated; however, as is well known a printer may have six pens or more, to hold different colors—or different dilutions of the same colors as in the more-typical four pens. The medium 4A thus receives inkdrops for formation of a desired image, and is ejected into the print-medium bin 5.

A very finely graduated encoder strip 233, 236 (FIG. 15) is extended taut along the scanning path of the carriage assembly 220 and read by another, very small automatic optoelectronic sensor 237 to provide position and speed information 237B for the microprocessor. One advantageous location for the encoder strip is shown in several of the earlier cross-referenced patent documents at 236, immediately behind the pens.

A currently preferred position for the encoder strip 33 (FIG. 14), however, is near the rear of the pen-carriage tray—remote from the space into which a user's hands are inserted for servicing of the pen refill cartridges. For either position, the sensor 237 is disposed with its optical beam passing through orifices or transparent portions of a scale formed in the strip.

The pen-carriage assembly 220, 220' (FIG. 15) is driven in reciprocation by a motor 231—along dual support and guide rails 232, 234—through the intermediary of a drive belt 235. The motor 231 is under the control of signals from digital processors 71.

Naturally the pen-carriage assembly includes a forward bay structure 222 for pens—preferably at least four pens 223–226 holding ink of four different colors respectively. Most typically the inks are yellow in the leftmost pen 223, then cyan 224, magenta 225 and black 226. As a practical matter, chromatic-color and black pens may be in a single printer, either in a common carriage or plural carriages.

Figure 13:
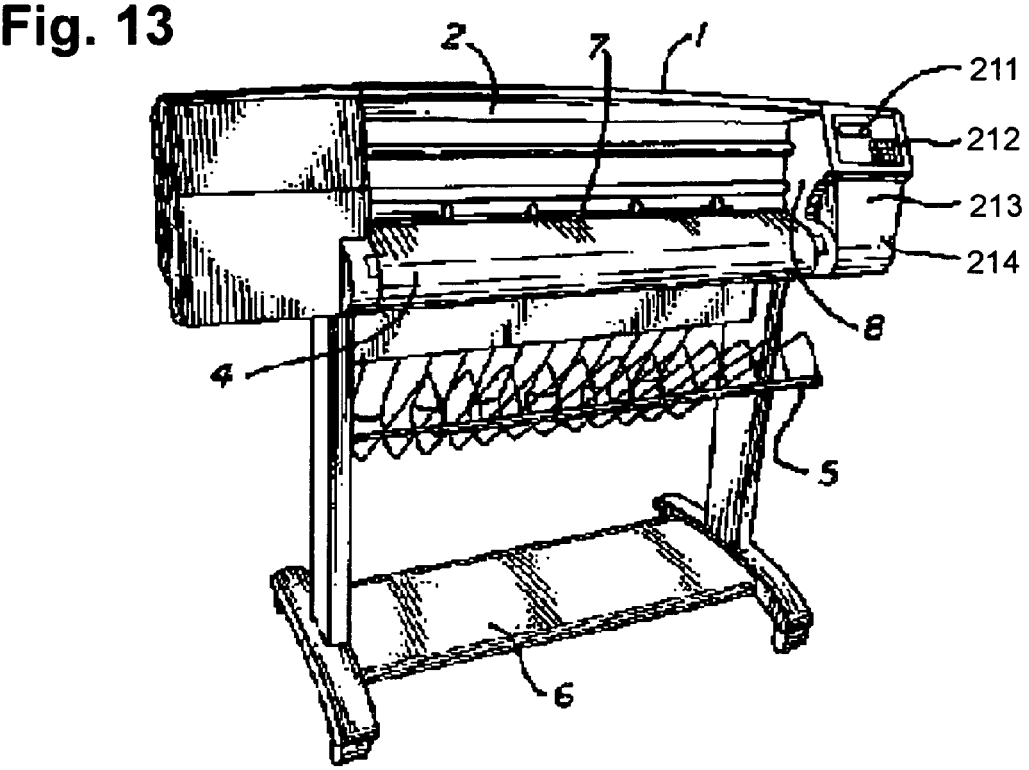
FIG. 13 is a perspective view of the exterior of a printing device embodying preferred embodiments of the invention.
Figure 14:
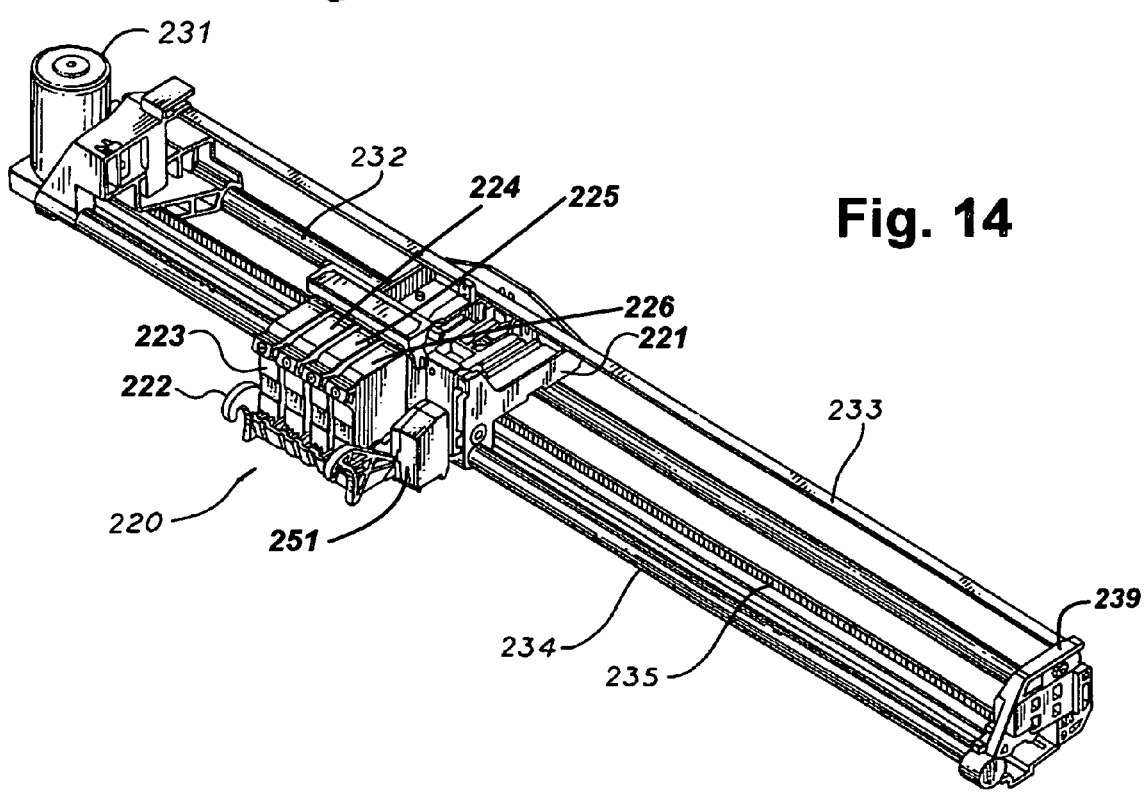
FIG. 14 is a like view of a scanning carriage and medium-advance mechanism in the FIG. 13 device.

Also included in the pen-carriage assembly 220, 2201 is a rear tray 221 carrying various electronics. FIGS. 13 and 14 most specifically represent a system such as the Hewlett Packard printer/plotter model "DesignJet 2000CP", which does not include the present invention. These drawings, however, also illustrate certain embodiments of the invention, and—with certain detailed differences mentioned below—a printer/plotter that includes preferred embodiments of the invention.

Figure 15:
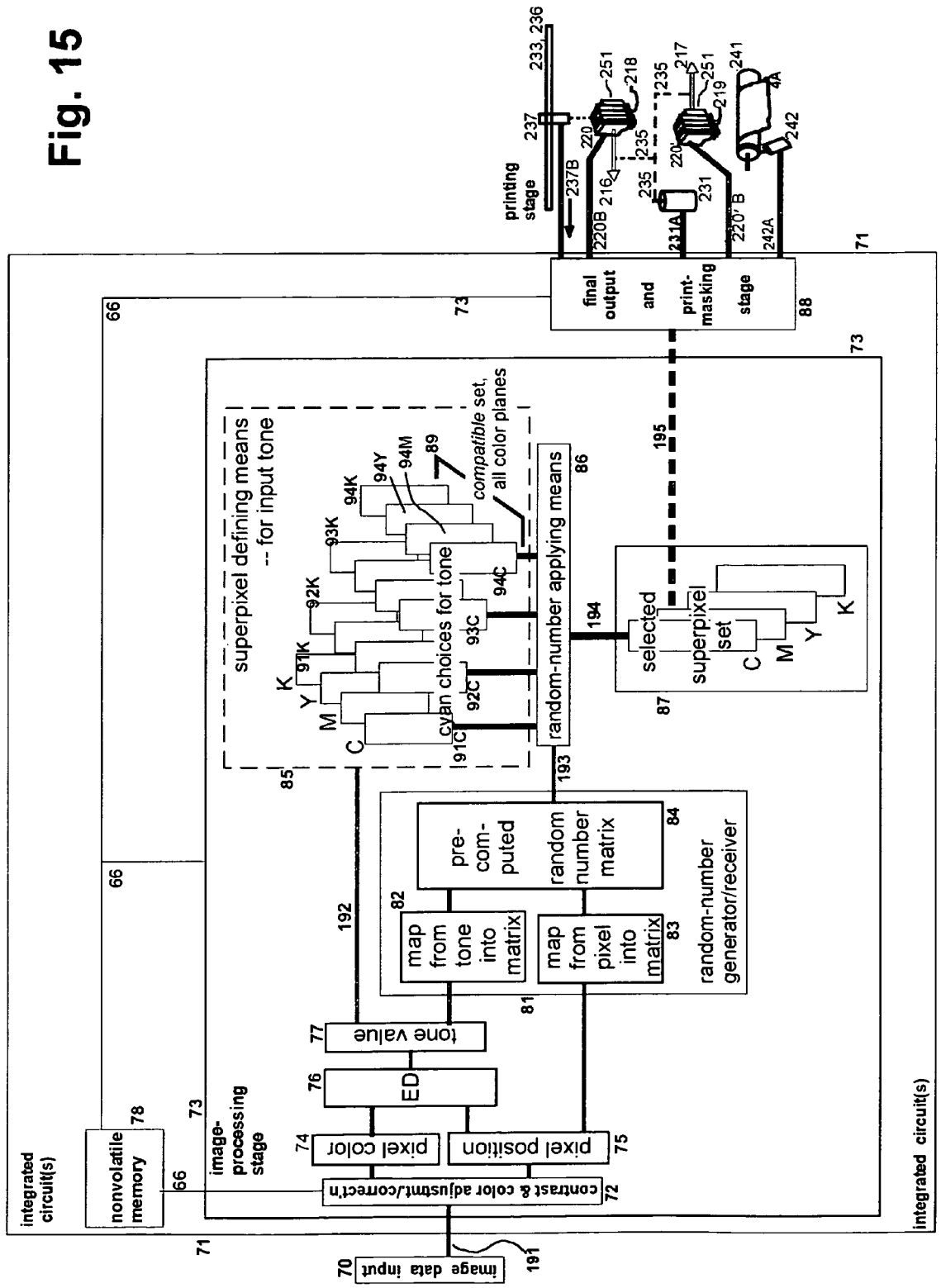
FIG. 15 is a highly schematic diagram of the working system of the FIGS. 13 and 14 device, particularly as used to practice preferred embodiments of the third above-introduced aspect of the invention.

Before further discussion of details in the block diagrammatic showing of FIG. 15, a general orientation to that drawing may be helpful. This diagram particularly represents preferred embodiments of the previously discussed fourth aspect of the invention.

Conventional portions of the apparatus appear as elements 70 through 78 at the left end of FIG. 15, and also the printing stage 220, 220', 241, 242, 237. Also generally conventional are related signals 66, 237B, 220B, 220'B, 231A, 242A, and the associated output/printmask stage 88 at the far right end of the diagram.

Features particularly related to the fourth aspect of the invention appear in the central region as elements 81 through 87. Given the statements of function and the diagrams presented in this document, an experienced programmer of ordinary skill in this field can prepare suitable programs for operating all the circuits.

The pen-carriage assembly is represented separately at 220 when traveling to the left 216 while discharging ink 218, and at 220' when traveling to the right 217 while discharging ink 219. It will be understood that both 220 and 220' represent the same pen carriage.

The previously mentioned digital processor 71 provides control signals 220B, 220'B to fire the pens with correct timing, coordinated with platen drive control signals 242A to the platen motor 242, and carriage drive control signals 231A to the carriage drive motor 231. The processor 71 develops these carriage drive signals 231A based partly upon information about the carriage speed and position derived from the encoder signals 237B provided by the encoder 237.

(In the block diagram all illustrated signals are flowing from left to right except the information 237B fed back from the sensor—as indicated by the associated leftward arrow.) The codestrip 233, 236 thus enables formation of color inkdrops at ultrahigh precision during scanning of the carriage assembly 220 in each direction—i.e., either left to right (forward 220') or right to left (back 220).

New image data 70 are received 191 into an image-processing stage 73, which may conventionally include a contrast and color adjustment or correction module 72, and an error-diffusion (ED) rendition module 76 which operates at relatively low resolution e.g. 12 dots/mm. The color module 72 provides paired pixel-position and pixel-color data points to the ED module 76.

In addition the pixel-position data pass to a module 81 that generates or receives random numbers for the operation of the present invention. Preferably the random numbers are preassembled into a matrix 84 as described earlier.

One of those numbers when needed is read out at 193 by two pointers 82, 83, which respectively respond to the output tone value 77 found by the error-diffusion block 76, and the pixel-position information 75 provided from the color module 72—also as earlier explained. A third pointer, namely identity of a color plane being rendered, may be employed as well; however, this third pointer is not shown here, as it can be unnecessary if the system will use superpixel sets that are interplane coordinated.

In addition to the preassembled random-number matrix 84, advantageously the apparatus has some means 85 defining groups of superpixels—a separate group 91C . . . 94K for each tone value 77, 192 output by the ED module 76. Each superpixel has a higher resolution, e.g. 24 dots/mm, than the ED resolution e.g. 12 dots/mm. Each superpixel group typically includes several choices, here four, for each colorant; thus there may be four cyan choices 91C, 92C, 93C, 94C for the particular tone level 192.

Thus if the color 192 to be printed contains cyan, the random number 193 read out from the matrix 84 is used by a number-applying module 86 to select for printing just one superpixel choice 94C for example. At the same time if the target color 192 also contains another subtractive primary, yellow for example, then a superpixel 94Y (continuing the same example) for that specific colorant is automatically selected from a prearranged compatible set of superpixels 94C–94K which includes the chosen superpixel 94C.

In FIG. 15 the superpixels are shown in a rank-and-file arrangement. For the given input tone 192, the choices of a specific colorant appear as the ranks; the compatible set of which each choice is a part appear as files. In the example above, the choice 94C was in the cyan rank, and the compatible set was the file 94C–94K.

Similarly if operation of the random-number applying means 86 instead produces a different cyan choice 92C (from the cyan rank of course—but now implicating a different file 92C–92K), and if the target color 192 also contains black, then a superpixel 92K may be selected from the same file as the chosen cyan superpixel 92C.

A selected superpixel, or members of a superpixel set, are read out as data 194 representing one or more selected superpixels 87. This selected superpixel, or group of superpixels, has the higher resolution sought for use in printing—in response to the lower resolution employed in the error diffusion 76.

The superpixel or group of superpixels next proceeds as information 195 from the image-processing stage 73 to enter the printmasking and final-output module 88—for specific pass and nozzle assignments, and development of control signals 220B, 231A, 220'B, 242A to drive the printing stage 220, 220', 241, 242 seen at right.

Integrated circuits 71 may be distributive—being partly in the printer, partly in an associated computer, and partly in a separately packaged raster image processor. Alternatively the circuits may be primarily or wholly in just one or two of such devices.

These circuits also may comprise a general-purpose processor (e.g. the central processor of a general-purpose computer) operating software such as may be held for instance in a computer hard drive, or operating firmware (e.g. held in a ROM 70 and for distribution 66 to other components), or both; and may comprise application-specific integrated circuitry. Combinations of these may be used instead.

In operation the system retrieves 301 (FIG. 16) its operating program appropriately—i.e., by reading instructions from memory in case of a firmware or software implementation, or by simply operating dedicated hardware in case of an ASIC or like implementation. Once prepared in this way, the method proceeds to the procedure 302 through 325 as illustrated.

Principal steps, as the drawing shows, include superpixel definition 302, image data generation or receipt 306, rendering 307–308, randomized-value generation 311, superpixel selection 323 using that randomized value, and final printout 325. Within the random-value block are two major alternatives: the matrix method 312 which has occupied major parts of the above disclosure, and the decorrelated-LSB method 322 which as mentioned earlier appears workable but requires extra tests and workarounds due to absence of reliable numbers when error is zero.

Details of the matrix method appear clearly in FIG. 16, correspondingly closely to the discussions in earlier subsections of this detailed description—and also to certain of the appended claims. One interesting and important point is that the system actually is characterized by three different spatial-frequency sets:

the spatial frequencies inherent in any image, any picture 306 as such—the frequencies corresponding to elements of a picture, e.g. faces, railway trains, trees and so on—which ordinarily vary broadly over an extremely wide range of frequencies unless a printing device is used exclusively to print area fills;

the spatial frequencies actually appearing in superpixels 87, 91–94 selected to present the image; and the frequencies that occur in randomized-number matrices or sequences 84, 193, or other mechanisms that are used to select superpixels.

The invention as introduced above and as defined in certain of the appended claims is not intended to interfere any further than necessary with the first-mentioned group; to the contrary an objective is to preserve and reproduce those frequencies within reasonable limits. Recitations, for example, may thus be found in certain claims to the effect that spatial frequencies other than information in the image appear substantially consistent in the printed image.

It has been shown that the second and third groups of frequencies are advantageously managed separately. The second, for instance, is advantageously constrained by Fourier-prescreening the superpixels themselves; and the third by precomputing a randomized matrix.

In view of the foregoing it is believed that a person skilled in this field will find the remaining details of FIG. 16 self explanatory.

The above disclosure is intended as merely exemplary, and not to limit the scope of the invention—which is to be determined by reference to the appended claims.

What is claimed is:

1. A method for printing an image; said method comprising:
 for at least each one of particular colorimetric levels that will be found in rendering the image, defining plural different superpixels;
 generating or receiving data for the image;
 rendering the image by a process that finds, for positions within the image:
  colorimetric levels, and
  a randomized value corresponding to substantially each found colorimetric level;
 applying the randomized value to select a superpixel from the plural superpixels for each found colorimetric level; and
 printing the image using the selected superpixels;
 wherein the superpixels defined for at least one colorimetric level vary in colorimetric value so as to express that colorimetric level, on average, as a nonintegral number of colorant quanta.

2. The method of claim 1, wherein the rendering step operates in a computational space that has:
 one dimension for each colorant available; plus
 at least one dummy dimension which generates said randomized value.

3. The method of claim 2, wherein:
 the rendering step operates by error diffusion.

4. The method of claim 1, wherein:
 the rendering step operates by error diffusion.

5. The method of claim 1, wherein:
 the image consists of color values in each of a large multiplicity of pixels;
 said positions comprise substantially each pixel of the image, at a reduced resolution relative to the printing step.

6. A method for printing an image; said method comprising:
 for at least each one of particular calorimetric levels that will be found in rendering the image, defining plural different superpixels;
 generating or receiving data for the image;
 rendering the image by a process that finds, for positions within the image:
  colorimetric levels, and
  a randomized value corresponding to substantially each found calorimetric level;
 applying the randomized value to select a superpixel from the plural superpixels for each found colorimetric level; and
 printing the image using the selected superpixels; and
 wherein:
 the rendering step operates in a computational space that has:
  one dimension for each colorant available; plus
  at least one dummy dimension which generates said randomized value; and
 operation of the rendering step in the at least one dummy dimension comprises using at least one least-significant bit that:
  results from the rendering step in a colorant dimension, but
  is substantially decorrelated from the colorimetric levels found by the rendering step.

7. A method for printing an image; said method comprising:
 for at least each one of particular calorimetric levels that will be found in rendering the image, defining plural different superpixels;
 generating or receiving data for the image;
 rendering the image by a process that finds, for positions within the image:
  calorimetric levels, and
  a randomized value corresponding to substantially each found calorimetric level;
 applying the randomized value to select a superpixel from the plural superpixels for each found calorimetric level; and
 printing the image using the selected superpixels; and
 wherein:
 the rendering step operates in a computational space that has:
  one dimension for each colorant available; plus
  at least one dummy dimension which generates said randomized value;
 operation of the rendering step in the at least one dummy dimension comprises deriving or maintaining a matrix of randomized values; and
 the applying step comprises mapping a particular location in the matrix to a particular position in the image, to choose a random value at said particular location in the matrix for selection of a superpixel to use at said particular position in the image.

8. The method of claim 7, wherein:
 the matrix comprises a set of smaller matrices, each of which contains randomized numbers corresponding to available superpixels; and
 successive ones of the smaller matrices are progressively stepped across the first-mentioned matrix.

9. A method for printing an image; said method comprising:
 for each of particular available colorimetric levels, defining plural different superpixels;
 generating or receiving data for the image;
 rendering the image by a process that finds colorimetric levels for positions within the image;
 deriving or maintaining a matrix of randomized values;
 mapping a particular location in the matrix to a particular position in the image, to choose a randomized value at said particular location in the matrix for selection of a superpixel to use at said particular position in the image; and printing the image using the selected superpixels.

10. The method of claim 9, wherein:

the superpixels defined for each available colorimetric level are all calorimetrically equivalent.

11. The method of claim 9, wherein:

the matrix is derived or corrected to possess a blue-noise property of the randomized values.

12. The method of claim 9, wherein:

the mapping step comprises interpreting the randomized value, chosen at said location in the matrix, as a pointer into a certain dimension of a table of superpixels.

13. The method of claim 9, wherein:

the mapping step comprises interpreting an input or output colorimetric level, for the particular position in the image, as a pointer into a certain dimension of a table of superpixels.

14. The method of claim 9, wherein the mapping step comprises:

interpreting the randomized value, chosen at said location in the matrix, as a pointer into a first dimension of a table of superpixels; and interpreting an input or output calorimetric level, for the particular position in the image, as a pointer into a second dimension of the table of superpixels.

15. The method of claim 14, wherein:

the mapping step comprises interpreting identification of a color plane being rendered, as a pointer into a third dimension of the table of superpixels.

16. The method of claim 14, wherein:

the mapping step comprises using said chosen randomized value for control of superpixels in all color planes.

17. The method of claim 9, wherein:

the matrix comprises a set of smaller matrices, each of which contains randomized numbers corresponding to available superpixels; and successive ones of the smaller matrices are progressively stepped across the first-mentioned matrix.

18. The method of claim 17, wherein:

said stepped smaller matrices also are tiled across the first-mentioned matrix and wrapped around at an edge of the first-mentioned matrix.

19. The method of claim 17, wherein:

the smaller matrices are all substantially identical.

20. The method of claim 17, wherein:

the smaller matrices comprise plural different interleaved arrays.

21. The method of claim 20, wherein:

the plural different arrays are different sizes.

22. The method of claim 17, wherein:

the smaller matrices are one-dimensional matrices.

23. The method of claim 9, wherein:

the superpixels defined for at least one colorimetric level vary in calorimetric value so as to express that colorimetric level, on average, as a nonintegral number of colorant quanta.

24. A method for printing an image; said method comprising the steps of:

defining, for each one of particular available colorimetric levels, plural different superpixels;

generating or receiving data for the image;

rendering the image by a process that finds colorimetric levels for positions within the image;

selecting a superpixel from the plural superpixels for the found calorimetric level;

controlling the defining or selecting step, or both, to impart a blue-noise property to the selected superpixels as an aggregate; and printing the image using the selected superpixels.

25. The method of claim 24, wherein:

the defining step comprises screening the superpixels for spatial-frequency characteristics;

whereby spatial frequencies, other than information in the image, appear substantially consistent in the printed image.

26. The method of claim 25, wherein:

the screening means comprises performing spatial Fourier analysis.

27. The method of claim 24, wherein:

the superpixels defined for at least one colorimetric level vary in calorimetric value so as to express that calorimetric level, on average, as a nonintegral number of colorant quanta.

28. Apparatus for printing an image; said apparatus comprising:

means for defining plural different superpixels for each one of particular available calorimetric levels;

means for generating or receiving data for the image;

means for rendering the image by a process that finds calorimetric levels for positions within the image;

means for generating or receiving a randomized value for each of the positions within the image;

means for applying the randomized value, in common for all color planes, to select for each color plane a respective superpixel from the plural superpixels for the found calorimetric level; and means for printing the image using the selected superpixels.

29. The apparatus of claim 28, wherein:

the applying means comprise means for employing a randomized value which corresponds to a compatible set of superpixels for different color planes.

30. The apparatus of claim 29, wherein:

the compatible set of superpixels comprises coordinated placement of colorant quantity in the different color planes to achieve a certain image-quality objective.

31. The apparatus of claim 30, wherein:

said coordinated placement comprises elimination of substantially all drop-on-drop placement across planes, within highlight regions of the image.

32. The apparatus of claim 28, wherein:

the superpixels defined for at least one colorimetric level vary in calorimetric value so as to express that calorimetric level, on average, as a nonintegral number of colorant quanta.

* * * * *

UNITED STATES PATENT AND TRADEMARK OFFICE
CERTIFICATE OF CORRECTION

PATENT NO.        : 7,031,021 B1
APPLICATION NO. : 09/642416
DATED              : April 18, 2006
INVENTOR(S)       : Antonio Lain et al.

It is certified that error appears in the above-identified patent and that said Letters Patent is hereby corrected as shown below:

In column 1, line 40, delete "calorimetrically" and insert -- colorimetrically --, therefor.

In column 1, line 67, delete "calorimetric" and insert -- colorimetric --, therefor.

In column 3, line 11, delete "calorimetric" and insert -- colorimetric --, therefor.

In column 3, line 20, delete "calorimetric" and insert -- colorimetric --, therefor.

In column 3, line 22, delete "calorimetric" and insert -- colorimetric --, therefor.

In column 3, line 52, delete "calorimetric" and insert -- colorimetric --, therefor.

In column 3, line 52, delete "calorimetrically" and insert -- colorimetrically --, therefor.

In column 3, line 55, delete "calorimetric" and insert -- colorimetric --, therefor.

In column 4, line 24, delete "calorimetric" and insert -- colorimetric --, therefor.

In column 4, line 58, delete "calorimetric" and insert -- colorimetric --, therefor.

In column 4, line 61, delete "a" before "both".

In column 5, line 19, delete "calorimetric" and insert -- colorimetric --, therefor.

In column 5, line 20, delete "calorimetric" and insert -- colorimetric --, therefor.

In column 6, line 20, delete "calorimetric" and insert -- colorimetric --, therefor.

In column 6, lines 24-25, delete "calorimetric" and insert -- colorimetric --, therefor.

In column 6, lines 31-32, delete "calorimetric" and insert -- colorimetric --, therefor.

In column 6, line 39, delete "calorimetric" and insert -- colorimetric --, therefor.

In column 7, line 14, delete "calorimetric" and insert -- colorimetric -- therefor.

In column 7, line 15, delete "calorimetric" and insert -- colorimetric --, therefor.

In column 7, line 15, delete "calorimetric" and insert -- colorimetric --, therefor.

UNITED STATES PATENT AND TRADEMARK OFFICE
CERTIFICATE OF CORRECTION

PATENT NO.       : 7,031,021 B1
APPLICATION NO.  : 09/642416
DATED            : April 18, 2006
INVENTOR(S)      : Antonio Lain et al.

It is certified that error appears in the above-identified patent and that said Letters Patent is hereby corrected as shown below:

In column 7, line 20, delete "calorimetric" and insert -- colorimetric --, therefor.

In column 8, line 23, delete "calorimetric" and insert -- colorimetric --, therefor.

In column 11, line 29, delete ""1rand48"" and insert -- "lrand48" --, therefor.

In column 16, line 58, delete "2201" and insert -- 220' --, therefor.

In column 19, line 62, in Claim 6, delete "calorimetric" and insert -- colorimetric --, therefor.

In column 20, line 3, in Claim 6, delete "calorimetric" and insert -- colorimetric --, therefor.

In column 20, line 24, in Claim 7, delete "calorimetric" and insert -- colorimetric --, therefor.

In column 20, line 30, in Claim 7, delete "calorimetric" and insert -- colorimetric --, therefor.

In column 20, line 32, in Claim 7, delete "calorimetric" and insert -- colorimetric --, therefor.

In column 20, line 34, in Claim 7, delete "calorimetric" and insert -- colorimetric --, therefor.

In column 21, line 7, in Claim 10, delete "calorimetrically" and insert -- colorimetrically --, therefor.

In column 21, line 25, in Claim 14, delete "calorimetric" and insert -- colorimetric --, therefor.

In column 21, line 56, in Claim 23, delete "calorimetric" and insert -- colorimetric --, therefor.

UNITED STATES PATENT AND TRADEMARK OFFICE
CERTIFICATE OF CORRECTION

PATENT NO. : 7,031,021 B1
APPLICATION NO. : 09/642416
DATED : April 18, 2006
INVENTOR(S) : Antonio Lain et al.

It is certified that error appears in the above-identified patent and that said Letters Patent is hereby corrected as shown below:

In column 22, line 7, in Claim 24, delete "calorimetric" and insert -- colorimetric --, therefor.

In column 22, line 23, in Claim 27, delete "'calorimetric" and insert -- colorimetric --, therefor.

In column 22, lines 23-24, in Claim 27, delete "calorimetric" and insert -- colorimetric --, therefor.

In column 22, line 29, in Claim 28, delete "calorimetric" and insert -- colorimetric --, therefor.

In column 22, line 32, in Claim 28, delete "calorimetric" and insert -- colorimetric --, therefor.

In column 22, line 39, in Claim 28, delete "calorimetric" and insert -- colorimetric --, therefor.

In column 22, line 56, in Claim 32, delete "calorimetric" and insert -- colorimetric --, therefor.

In column 22, lines 56-57, in Claim 32, delete "calorimetric" and insert -- colorimetric --, therefor.

Signed and Sealed this

Seventh Day of April, 2009

JOHN DOLL
*Acting Director of the United States Patent and Trademark Office*